US006435470B1

(12) United States Patent
Lahham et al.

(10) Patent No.: US 6,435,470 B1
(45) Date of Patent: *Aug. 20, 2002

(54) TUNABLE VIBRATION NOISE REDUCER WITH SPHERICAL ELEMENT CONTAINING TRACKS

(75) Inventors: Jamil I. Lahham, Ruckersville; Lloyd S. Sikes, Charlottesville; Stephen J. Ryan, Palymra, all of VA (US)

(73) Assignee: Northrop Grumman Corporation, Los Angles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/667,314

(22) Filed: Sep. 22, 2000

(51) Int. Cl.[7] .................................. F16M 1/00
(52) U.S. Cl. ...................... 248/638; 248/632
(58) Field of Search ................. 248/638, 632, 248/618, 621, 634, 560, 583

(56) References Cited

U.S. PATENT DOCUMENTS

| | | | | |
|---|---|---|---|---|
| 3,425,652 A | * | 2/1969 | Leary | 248/632 |
| 3,780,207 A | * | 12/1973 | Crosby et al. | 174/42 |
| 5,012,174 A | | 4/1991 | Adkins et al. | |
| 5,267,720 A | | 12/1993 | Brazell et al. | |
| 5,775,049 A | * | 7/1998 | Fricke | 52/720.1 |
| 5,820,348 A | * | 10/1998 | Fricke | 416/248 |
| 5,905,804 A | * | 5/1999 | Lee | 381/386 |
| 6,056,259 A | | 5/2000 | Lahham | |

* cited by examiner

*Primary Examiner*—Leslie A. Braun
*Assistant Examiner*—A. Joseph Wujciak, III
(74) *Attorney, Agent, or Firm*—Seymour Levine; Gerald Lett

(57) ABSTRACT

A tunable mass coupled to a body subjected to forced vibrations that reduces the vibration amplitudes of the body in the forced vibration frequency band. The mass includes a container having a plurality of cavities with grooves in the lower surfaces and notched side walls. Each cavity is filled with spherical elements which are restrained by the grooves and notches. The tunable mass is constructed to respond in a spring like manner so that vibration frequencies of the mass are tunable to provide counter vibrations in the forced vibration frequency band. Vibration frequency amplitude reduction is provided by vibrations of the mass that are in phase opposition to the vibrations of the body.

12 Claims, 4 Drawing Sheets

TUNABLE VIBRATION NOISE REDUCER WITH SPHERICAL ELEMENT CONTAINING TRACKS

BACKGROUND OF THE INVENTION

1. Field of the Invention

The invention relates to the field of structure-borne noise reduction, and more particularly to apparatus for countering vibrations of elements coupled to the structure.

2. Description of the Prior Art

Ring laser gyroscopes (RLG) utilize two monochromatic laser beams propagating in opposite directions about a closed loop. Rotation of the apparatus about the loop axis effectively increases the beam path length in one direction and decreases the beam path in the opposite direction. Since the laser frequencies of the two counter-rotating beams are functions of the lasing path length, the differential path length established by the rotation of the RLG causes a frequency difference between the two beams. The magnitude and sign of this frequency difference are representative of the RLG's rate and direction of rotation and may be monitored for these purposes in manners well known in the art. At low rotation rates, the frequency difference between the counter-rotating beams is small and the beams tend to resonate at the same frequency, i.e. lock-in, and the RLG appears to be stationary. This lock-in prevents the RLG from sensing rotation rates that are at or below the lock-in rate. To reduce the lock-in rate, the RLG is mechanically oscillated, dithered, about its axis to establish rotation in one direction and then the other. Such dithering provides a signal at the output terminals that is substantially independent of the mechanical oscillation while maintaining an apparent rotation in each direction, thus reducing the lock-in rotation rate.

The dithering causes the structure on which the RLG is mounted to vibrate, thereby generating structure-borne noise which adversely effects equipment mechanically coupled to the mounting structure. One method of the prior art for reducing structure-borne noise is disclosed in U.S. Pat. No. 5,012,174 issued to Charles M. Adkins, et al and assigned to the assignee of the present invention. Adkins, et al teach a device which is attached directly to the RLG platform and electronically establishes counter vibrations of the platform to cancel vibrations induced by the dithering RLG. The apparatus taught by Adkins, et al, however, is complex mechanically and electrically and is too expensive for use with the relatively inexpensive RLG.

Another method of the prior art for reducing structure-borne noise is disclosed in U.S. Pat. No. 5,267,720 issued to James R. Brazell, et al and assigned to the assignee of the present invention. Brazell, et al teach the use of a pair of noise attenuator assemblies positioned along mutually perpendicular rotational axes. Each noise attenuator includes a precision ground valve spring captivated in a highly damped elastomeric material molded to a machined housing. Matching of the noise attenuators and alignment of the rotational axes must be performed to close tolerances to achieve the required platform stabilization. Suppression of mechanical resonances of the sensor supporting structure is achieved by applying a viscoelastic constrained layer to 90 percent of the external surfaces. To meet shock, vibration, and structure-borne noise isolation, high precision machining, tight tolerances on molded elastomers, matched preloaded noise attenuators, and extensive inspection are required. Thus, the device is difficult to manufacture and assemble and therefore, costly.

The above limitations were overcome by the invention disclosed in U.S. Pat. No. 6,056,259 issued to Jamil I. Lahham and assigned to the assignee of the present invention. This patent teaches the utilization of a tunable auxiliary mass coupled to an element vibrating at forced vibration frequencies. The auxiliary mass is tuned to vibrate at the forced vibration frequencies out of phase with the element vibrations, thus reducing the structure-borne noise.

Included in the auxiliary mass is a four cavity chamber, each having a flat base and a flat top. These cavities are filled to capacity with steel shots to provide the mass and stiffness required to achieve the desired tuned vibration frequency. Chamber and steel shot tolerances, however, establish a random steel shot arrangement geometry. This randomness, however slight, may, for some assemblies, provide an auxiliary mass that may not be appropriately tuned, thereby requiring iterations of re-assemblies and concomitant structure-borne noise measurements to achieve the desired auxiliary mass vibration frequency.

SUMMARY OF THE INVENTION

In accordance with the present invention the randomness of the steel shot arrangement is substantially eliminated by constructing the four cavity chamber with the base of each cavity containing a multiplicity of grooves which contain and guide spherical elements, such as steel ball bearings. The grooves are positioned and dimensioned so that the spherical elements fill each cavity in a touch relationship with adjacent spherical elements and cavity walls. Arranging the spherical elements and grooves in this manner maintains the spherical elements motionless in each cavity.

These and other aspects of the invention will be more fully understood by referring to following detailed description and the accompanying drawings.

DESCRIPTION OF THE PREFERRED EMBODIMENTS

Figure 1:
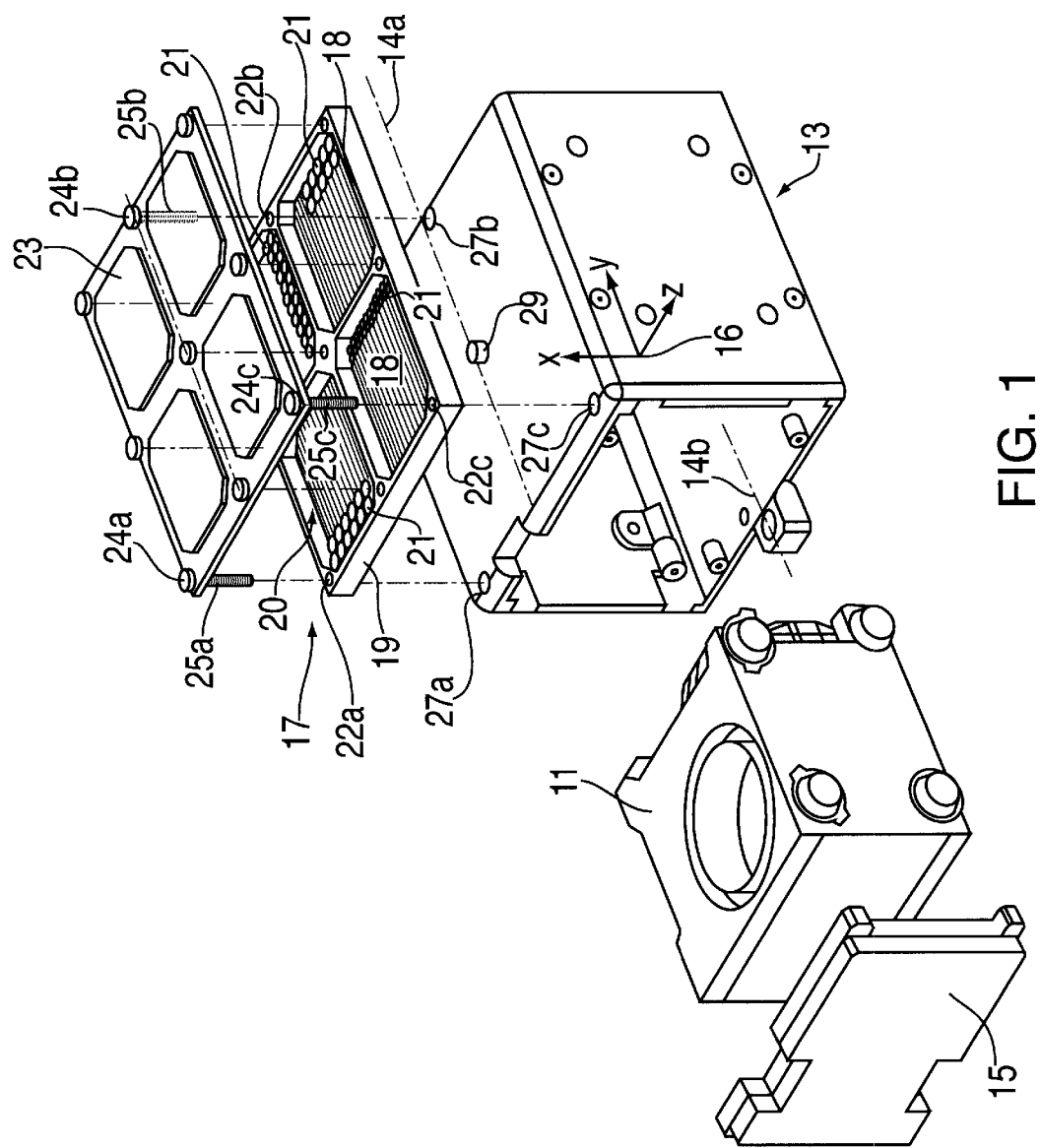
FIG. 1 is an exploded view of an assembly of a vibration forcing unit, its housing, and a preferred embodiment of the invention.

Refer now to FIG. 1. A vibrating device 11, such as a dithered RLG, may be positioned in a housing 13, which may be closed by a cover 15 containing the electronics required for an RLG operation. External forces acting on a body cause the body to vibrate at the forcing frequencies generated by the external forces. Vibrations of the device 11, such as the dithering of an RLG, cause forced vibrations of the housing-cover assembly 13,15, which act as a unit body. The forced vibrations are at the forcing frequencies generated by the vibrating device 11. As explained in U.S. Pat. No. 6,056,259, which is incorporated herein by reference, to reduce the vibration amplitudes of the housing-cover assembly 13,15 response to the forcing frequencies, the housing-cover assembly 13,15 is designed to have a natural frequency $\omega_0$ that is lower than the lowest forcing frequency. It is well known that the natural frequency of a body is determined from $\omega_0^2 = k/m$, where k is the stiffness of the body and m its mass. Therefore, a natural frequency $\omega_0$ may be positioned below the lowest forcing frequency with the selection of construction material, wall thickness, and points of constraints about the housing to establish the proper ratio of k/m. For a resonant frequency above the fundamental mode, an auxiliary mass 17 is attached to the housing cover assembly 13, 15 so that the combined system resonance is minimized in the forcing frequency range. To accomplish this, the amplitude $x_0$ of the forced vibration of a single degree of freedom system should be minimized. For an undamped system $x_0$ is known to be in the order of $$x_0 = \frac{P_0}{k_0}\left[1 - \left(\frac{\omega}{\omega_0}\right)^2\right]$$

where:
- $P_0$ is the amplitude of the exciting force
- $k_0 = m_0 \omega_0^2$
- $m_0$ is the mass of the housing-cover assembly 13,15
- $\omega$ is the forcing frequency
- $\omega_0$ is the natural frequency of the housing-cover assembly
- $P_0/k_0$ is the static deflection of a theoretical spring.

It is evident from the above equation that the deflection amplitude is decreased by increasing the value of $k_0$. This may be accomplished by increasing the mass mo with the concomitant increase in the value of $k_0$. Coupling an auxiliary mass 17 to the housing-cover assembly 13,15 adds a mass $m_{eq}$ to the overall system that is given by:

$$m_{eq} = \frac{m_{am}}{1 - \left(\frac{\omega}{\omega_{am}}\right)^2}$$

where,
- $m_{eq}$ is the equivalent mass added by the auxiliary mass system
- $m_{am}$ is the actual mass of the auxiliary mass assembly 17
- $\omega_{am}$ is the natural frequency of the auxiliary mass Addition of the equivalent mass establishes a vibration amplitude for the combined system that is a function of a forced frequency ratio $\beta_{am} = \omega/\omega_{am}$, the mass ratio $\mu = m_{am}/m$, and the static deflection of the housing-cover assembly 13,15, which may be determined from $$x_0 = \frac{P_0}{k} \frac{(1 - \beta_{am}^2)}{(1 - \beta_{am}^2)(1 - \beta^2) - \beta^2 \mu}$$

where
$\beta = \omega/\omega_0$

From the above it is evident that the vibration amplitude $x_0$ at a forcing frequency $\omega$ is substantially zero when the auxiliary mass resonance frequency is tuned to the forcing frequency, i.e. $\omega_{am} = \omega$ or equivalently $\beta_{am} = 1$.

As previously stated, to minimize vibrations, the housing-cover assembly 13,15 is constructed such that its first fundamental frequency is out of the forcing frequency band of the vibrating device 10. It is preferable that this natural frequency be chosen below the forcing frequency band.

Figure 2B:
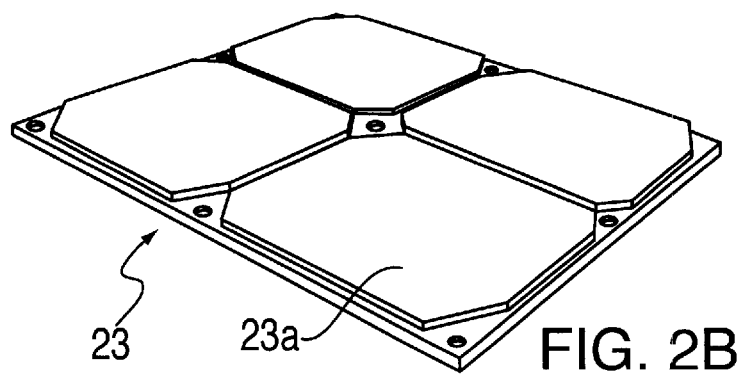
FIGS. 2A, 2B, and 2C provide details of the four cavity auxiliary mass shown in FIG. 1
Figure 2A:
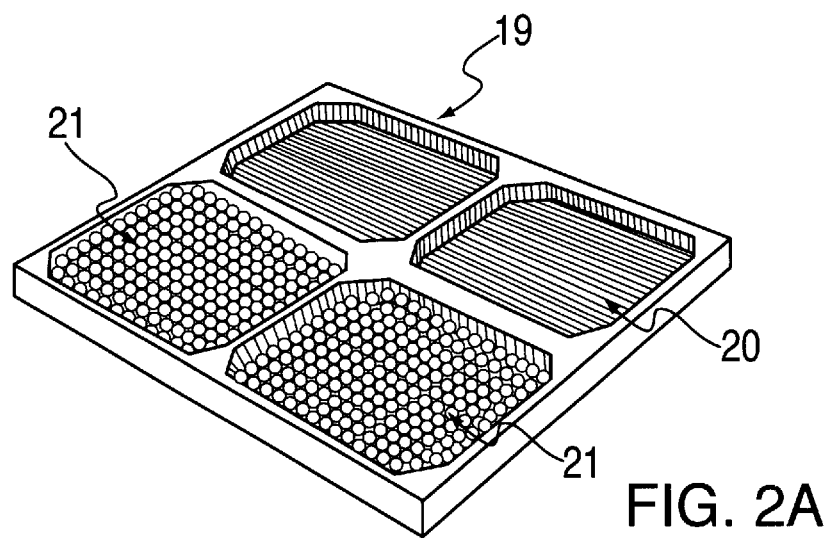
Figure 2C:
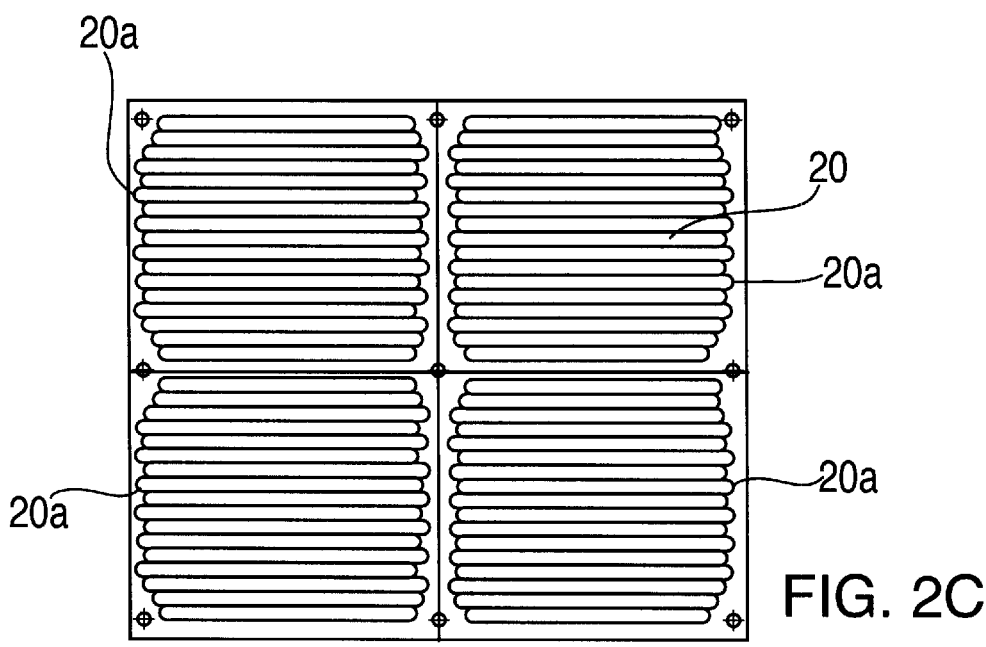

To reduce the vibration amplitudes within the forcing frequency band an auxiliary mass 17, having one natural frequency above the forcing frequency band, is added to the housing-cover assembly 13,15. The auxiliary mass 17 comprises a sectionalized base plate 19, which may have four cavities, each cavity having a multiplicity of grooves 20 in the base plate 19, as shown in FIG. 2A, A normal view of the base 19 with the grooves 20 is shown in FIG. 2C. Spherical elements, such as stainless steel ball bearings 21, are positioned in the grooves between the base plate 19 and a cover 23 to fill each section. The cover 23 has raised sections 23a, as shown in FIG. 2B, which form the top walls of the cavities. The ball bearings are sized to be restrained by the cover 23, grooves 20 in the base plate 19 and notches 20a in the side walls of the base plate 19 to maintain a predictable arrangement in the cavities and to insure motionless contact with adjacent ball bearings, the base plate, the cover, and the side walls. For clarity, only a limited number of ball bearings are shown in the figures. Precision machining of grooves in the base plate 19 and notches 20a in the side walls to fit the curvature of the ball bearings provide a compact nesting pattern in the cavities for the stainless steel ball bearings.

Figure 3A:
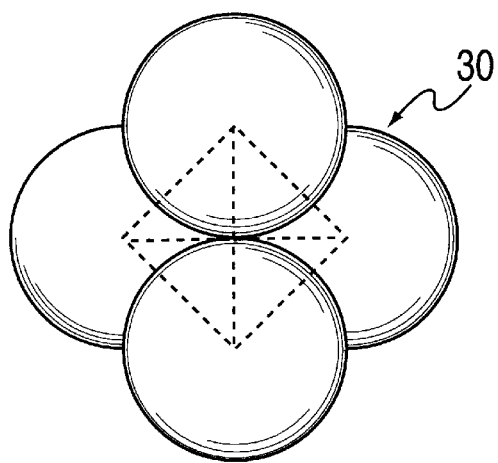
FIG. 3A illustrates the pyramidal configuration for the nesting pattern of the spherical elements within a cavity.

This geometry allows the ball bearings 21, to fit in a stable nesting pattern of a basic three cornered pyramid configuration 30 as shown in FIG. 3A, thus assuring that the ball bearings remain in a contacting relationship with all adjacent ball bearings and walls and eliminating a random geometry for the positioning of the ball bearings. The combination of stainless steel ball bearings positioned in precision machined grooves in the base plate, cover, and notches in the side walls insures a predictable assembly of the auxiliary mass.

Figure 3B:
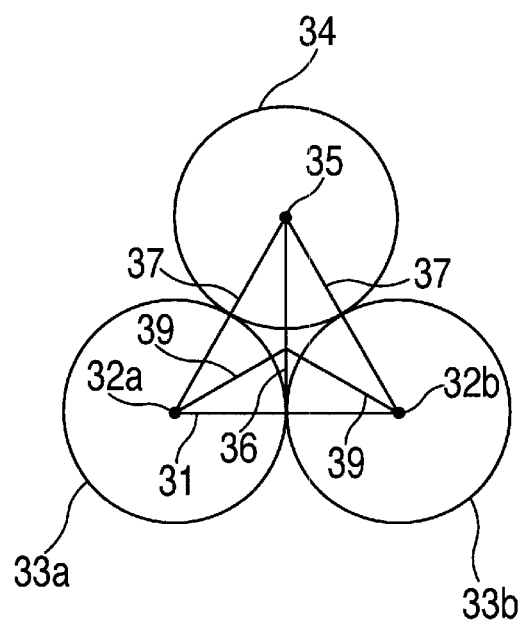
FIG. 3B shows the relationship of a top spherical element of FIG. 3A to two of the lower spherical elements.

The relationship of the top ball bearing 34 to two of the lower ball bearings is shown in FIG. 3B. In this figure it should be recognized that the spacing 31 of the centers 32a and 32b of the two lower ball bearings 33a and 33b is 2 r, where r is the radius of each ball bearing. When the upper ball bearing 34 is positioned in the pyramid 30 its center 35 is in a plane that is offset from the plane of the centers 32a and 32b of the lower ball bearings 33a, 33b by a distance 36 that is equal to 0.577 r, while the slant distances 39 to the projection point of the upper ball center to the plane is 1.155 r. The slant distances 37 between the lower ball bearing centers and the upper ball bearing center is 1.732 r.

Figure 4A:
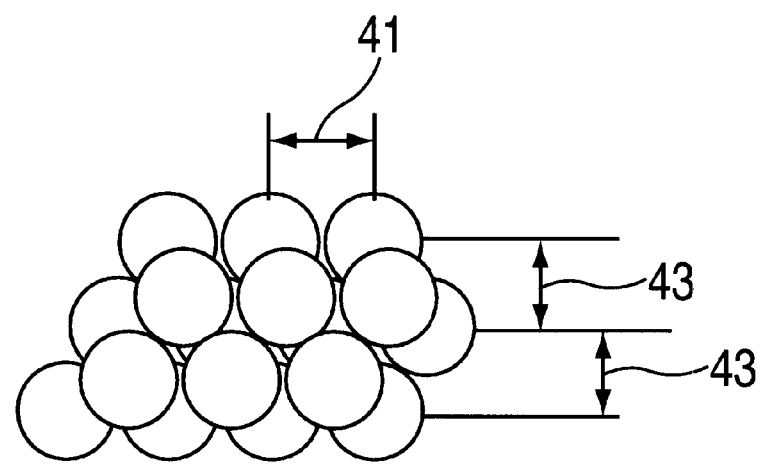
FIGS. 4A and 4B are top and side views, respectively, of the nesting pattern.
Figure 4B:
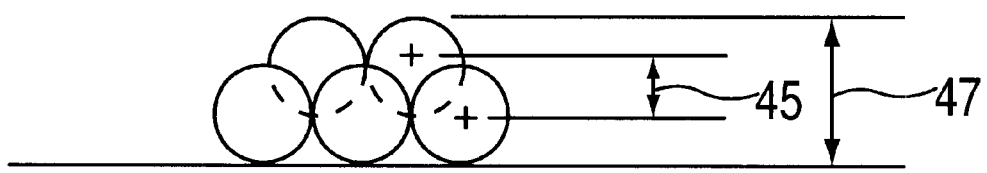

Top and side views of nested ball bearing sections are shown in FIGS. 4A and 4B. It is evident that the separation 41 between centers of adjacent ball bearings at the same nesting level in any row is 2 r. In the nesting arrangement adjacent rows at the same nesting level are offset. This offset causes a ball bearing of one row to be positioned in the crevice between two contacting ball bearings of the adjacent row. Consequently, the center spacings 43 between ball bearings in adjacent rows are less than the center spacings between adjacent ball bearings in the same row. As a result of this crevice positioning the center spacings 37, shown in FIG. 3B, between ball bearings in adjacent rows are 1.732 r. Further, in the nesting arrangement a ball bearing in the upper layer is positioned in the crevice formed by three adjacent ball bearings in the lower layer, as shown in FIG. 3A. This causes the separation 45 between ball bearing centers in adjacent layers to be even less than the separation between centers in the same layer. As a consequence of the positioning of ball bearings in the upper layer in the crevices between three ball bearings of the lower layer the ball bearing center separations 45 between layers are 1.632 r, resulting in an overall height 47 for a two layer nesting arrangement of 3.632 r.

Refer again to FIG. 1. Screws 25a, 25b, and 25c, which extend through pass-through holes 24a, 24b, and 24c in the cover 23 and pass-through holes 22a, 22b, and 22c in the base plate 19 to threaded holes below spacers 27a, 27b, and 27c, couple the auxiliary mass 17 to the housing assembly 13,15. A predetermined uniform air-gap between the housing 13 and the auxiliary mass 17 is achieved with the utilization of the spacers above 27a, 27b, and 27c and by seating the auxiliary mass 17 on a casted boss 29 on the housing 13.

The stainless steel ball bearings utilized to fill the cavities provides the desired combination of mass and rigidity for the auxiliary mass. The total mass of the auxiliary mass is computed to achieve the desired tuning frequency and to place the combined system resonances outside the forcing frequency band. A characteristic equation for the combined housing-cover 13,15 and auxiliary mass 17 may be provided by setting the denominator of the preceding equation to zero, as shown.

$$(1-\beta_{am}^2)(1-\beta^2)-\beta^2\mu=0$$

Setting $\omega_n=\omega$ and rewriting this equation as a function of $\omega_n, \omega_0, \omega_{am}$ and $\mu$ establishes the following equation $$(\omega_n^2-\omega_{am}^2)(\omega_n^2-\omega_o^2)-\omega_n^2\omega_{am}^2\mu=0$$

which is the characteristic equation of the combined system from which the combined system resonance frequency $\omega_n$ is computed as $$\omega_n^2 = \frac{\omega_{am}^2(1+\mu)-\omega_0^2}{2} \pm \sqrt{\left[\frac{\omega_{am}^2(1+\mu)-\omega_0^2}{2}\right]^2 + \omega_{am}^2\omega_0^2\mu}$$

This equation determines the squares of the combined system resonant frequencies $\omega_{n1}$ and $\omega_{n2}$ for a selected mass ratio $\mu=m_{am}/m$. Computations for various mass ratios permits the selection of a resonant frequencies that are outside the forcing frequency band.

For example, consider a forcing frequency band between 450 Hz and 650 Hz, housing-cover assembly 13,15 with a weight of 20 lbs and having a natural frequency of 534 Hz and selected mass ratios of 0.1, 0.2, and 0.25. For this situation the combined system resonances can be selected for the undesired resonance of 534 Hz.

For $\mu_m=0.1$:

$\omega_{n1}=1.18\omega_{am}=630.1$ Hz $\omega_{n2}=0.88\omega_{am}=469.9$ Hz

Since both $\omega_{n1}$ and $\omega_{n2}$ are within the forcing frequency band, this mass ratio is not adequate.

For $\mu=0.2$:

$\omega_{n1}=1.25\omega_{am}=667.5$ Hz $\omega_{n2}0.80\omega_{am}=427.2$ Hz

These frequencies, though outside the forcing frequency band, too close to the band edges, especially at the upper end.

For $\mu=0.25$:

$\omega_{n1}=1.13\omega_{am}=694.2$ Hz $\omega_{n2}=0.78\omega_{am}=416.5$ Hz

This mass ratio is adequate to place the resonant frequency of combined system, housing-cover and auxiliary mass 13,15 and 17, comfortably outside the forcing frequency band. Thus the mass ratio 0.25 eliminates the resonance of the housing-cover assembly 13,15.

A higher mass ratio widens the dead frequency band for the combined system at the expense of increasing the overall weight of the unit and the stiffness of the auxiliary mass to maintain the same $\omega_{am}$. This is not attractive. Thus the total weight of the auxiliary mass, $m_{am}$, is 5 lbs (0.25×20 lbs). Further, weight is equal to mass times the acceleration of gravity (w=mg; g=386 in/sec²). Thus, the total mass of the auxiliary mass 17 is $m_{am}$=0.01295 lbs·sec²/in. Since the rigidity of the auxiliary mass may be determined from $k_{am}=\omega_{am}^2 m_{am}$, the rigidity $k_{am}$ of the auxiliary mass 17 may be (534×2π)²×0.01295=145785 lbs/in, which is its total spring stiffness.

The construction of the auxiliary mass 17 and the screws 25a, 25b, and 25c establish a tuning mass-spring system which may be fine tuned by adjusting the torque on the screws to counteract forced vibrations of the housing-cover assembly 13,15. Attachment points 27a, 27b, and 27c on the housing 13 for accepting the coupling screws 25a, 25b, and 25c, respectively, are selected to maximize the housing-cover 13,15 motion suppression and to enhance the stability of the auxiliary mass 17 during externally induced sinusoidal and random environmental vibration at the resonance frequency of the combined structure. The reactive force performance of the auxiliary mass 17 is significantly increased by triangularly positioning coupling points 27a, 27b and 27c as shown in FIG. 1. Positioning the coupling points in this manner enforces nodes at locations 27a and 27c for the forced vibration frequency. Optimal tuning is achieved by adjusting the torque on the screws 25a and 25c to drive points 27a and 27c to lie in a horizontal fixed plane.

The auxiliary mass 17 is constructed and arranged to have a natural frequency that is substantially equal to the undesired frequency in the forcing frequency band and a flexural mode substantially identical to that of the housing-cover assembly 13,15. The material of the base plate 19 and cover 23, the weight of the ball bearings 21, and the torque on the screws 25a, 25b, and 25c are selected to provide a stiffness $k_{am}$ and a mass $m_{am}$ so that the ratio $k_{am}/m_{am}=\omega_{am}$ is approximately equal to the oscillating frequency of the housing-cover assembly 13,15 as excited by the forcing frequency. Consequently, the vibrations of the assembly 13,15 are countered by the addition of the auxiliary mass 17 causing a significant reduction in the vibrations of the overall system.

Attaching the auxiliary mass as described above creates a zero motion zone (vibration node) at locations 24a and 24c respectively coupled to locations 27a and 27c. This is achieved by locating the auxiliary mass inherent nodal line 26 parallel to the nodal line 14a of the housing 13 defined by the two points 29 and 27b. The auxiliary mass is activated when the pad 29 on upper wall 13a of the housing 13 establishes contact with the auxiliary mass and with the torque applications on the hardware 25a, 25b and 25c. It should be recognized that the addition of the auxiliary mass assembly 17 to the housing 13 without a spacer pad at location 29, results in a full surface-to-surface contact along the entire upper wall surface of 13a. This tends to add the auxiliary mass $m_{am}$ directly to the housing-cover mass $m_0$ for a total combined system mass of $(m_{total}=m_0+m_{am})$ with negligible $k_{am}$ contribution such that $\omega_{am}<<\omega$ and $\beta_{am}\sim 0$ which yields an undesired application of vibration amplitude $$x_0=(P_0/k)/[(1-\omega^{2/}(k/m_{total})]$$

While the invention has been described in its preferred embodiments, it is to understood that the words that have been used are words of description rather than limitation and that changes may be made within the purview of the appended claims without departing from the true scope and spirit of the invention in its broader aspects.

We claim:

1. A method for reducing forced vibrations of a body within a vibration frequency band having a first band end and a second band end comprising the steps of:

constructing a an auxiliary mass with a base plate, said base plate having a multiplicity of cavities, each cavity having a base, and side walls;

forming grooves in said base and notches in said side walls;

positioning spherical elements in said cavities in a manner to be constrained by said grooves and notches, said auxiliary mass with said cavities filled with said spherical elements being a mass that vibrates in response to applied external forces; and coupling said auxiliary mass to said body to form a composite structure such that said composite structure, when subjected to a forcing frequency, vibrates at frequencies within said vibration frequency band with vibration amplitudes that are lower than vibration amplitudes of said body without said coupling of said mass.

2. A method in accordance with claim 1 further including the step of sizing said spherical elements to be in motionless contact in each of said cavities.

3. A method in accordance with claim 2 further including the step of nesting said spherical elements in said cavities in pyramidal layers.

4. A method in accordance with claim 3 wherein said nesting step includes the step of providing two layers.

5. A method in accordance with claim 1 further including the steps of:

constructing said body to have a natural frequency out of said frequency band adjacent said first band end; and constructing said mass to have a natural frequency outside of said frequency band adjacent said second band end.

6. A method in accordance with claim 1 further including the steps of:

creating tapped holes in said body at predetermined locations;

establishing pass-through holes in said sectionalized plate and said plate at positions corresponding to said predetermined locations; and passing screws through said pass-through holes into said tapped holes; and adjusting tensions on said screws to tune vibration frequencies of said mass.

7. A method in accordance with claim 6 further including the step of providing spacers on said body to maintain a predetermined distance between said body and said mass.

8. A method in accordance with claim 6 further including the step of providing a pad on said body that activates said mass.

9. An apparatus for reducing forced vibrations of a body comprising:

an auxiliary mass that vibrates in response to external forces having a plurality of cavities, each cavity having a base and side walls, said base having grooves and said side walls having notches therein, said auxiliary mass constructed and arranged for coupling to said body;

spherical elements positioned in each of said cavities in a manner to be restrained by said grooves and said notches;

whereby, when said auxiliary mass is coupled to said body, a composite structure is formed which, when subjected to external forces, vibrates with amplitudes that are lower than vibration amplitudes of said body without said auxiliary mass.

10. An apparatus in accordance with claim 9 wherein said spherical elements are immovably positioned in said cavities.

11. An apparatus in accordance with claim 9 wherein said spherical elements are nested in said cavities in pyramidal layers.

12. An apparatus in accordance with claim 11 wherein two layers of spherical elements comprise said pyramidal layers.

* * * * *